United States Patent [19]

Tsutsumi et al.

[11] Patent Number: 5,059,379

[45] Date of Patent: Oct. 22, 1991

[54] METHOD OF RESIN SEALING SEMICONDUCTOR DEVICES

[75] Inventors: Yasutsugu Tsutsumi; Sueyoshi Tanaka; Tatsuro Takahashi; Yutaka Morita; Hideaki Seuzaki; Hiromichi Yamada, all of Fukuoka, Japan

[73] Assignee: Mitsubishi Denki Kabushiki Kaisha, Japan

[21] Appl. No.: 447,917

[22] Filed: Dec. 8, 1989

[30] Foreign Application Priority Data

Jul. 20, 1987 [JP] Japan .................................. 62-180297
Jul. 27, 1987 [JP] Japan .................................. 62-187317
Jul. 27, 1987 [JP] Japan .................................. 62-187318
Jul. 27, 1987 [JP] Japan .................................. 62-187319
Jan. 28, 1988 [JP] Japan .................................. 62-17876

[51] Int. Cl.⁵ .................................................. B29C 45/14
[52] U.S. Cl. .......................... 264/272.14; 264/272.17
[58] Field of Search ...................... 264/272.11, 272.13, 264/272.17, 328.1, 328.9, 272.14; 425/116, 121, 123, 125, 127, 150, 406, 588, 589, DIG. 44, DIG. 124

[56] References Cited

U.S. PATENT DOCUMENTS

| 4,555,086 | 11/1985 | Kiyotomo | 249/67 |
| 4,615,857 | 10/1986 | Baird | 264/272.17 |
| 4,735,563 | 4/1988 | Tanaka et al. | 425/116 |
| 4,779,835 | 10/1988 | Fukushima et al. | 249/161 |

FOREIGN PATENT DOCUMENTS 62-26827  2/1987  Japan .

Primary Examiner—Jan H. Silbaugh
Assistant Examiner—Angela Ortiz
Attorney, Agent, or Firm—Leydig Voit & Mayer

[57] ABSTRACT

A method of resin sealing semiconductor devices wherein semiconductor devices, such as semiconductor chips, are placed in cavities provided in a pair of chase blocks which are clamped by a press machine through support members capable of elastic compressive deformation. Plastic is then injected into the cavities of the chase blocks to resin seal the semiconductor devices.

2 Claims, 6 Drawing Sheets

FIG. 7
FIG. 8
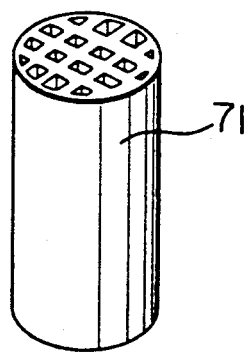
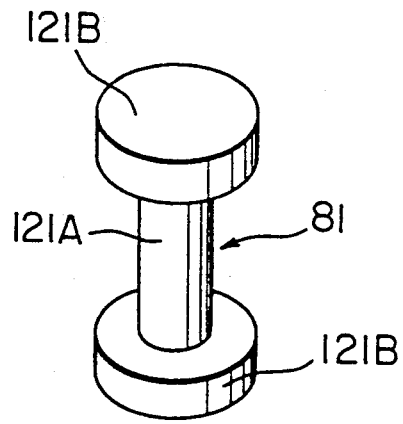
FIG. 9
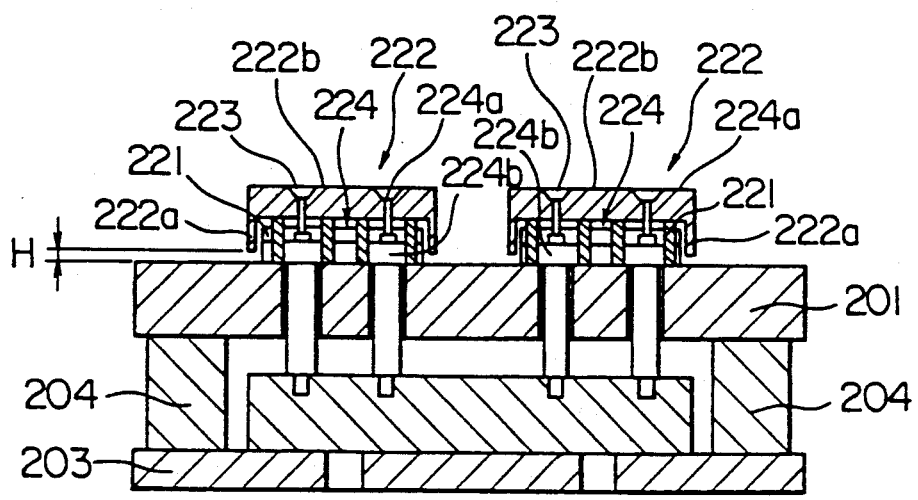

METHOD OF RESIN SEALING SEMICONDUCTOR DEVICES

This application is a division of application Ser. No. 219,483, filed July 15, 1988, now U.S. Pat. No. 4,915,608.

BACKGROUND OF THE INVENTION

1. Field of the Invention

This invention relates to an improvement in a method of and a device for resin sealing semiconductor devices.

2. Description of the Prior Art

FIG. 1 shows a conventional device for resin sealing semiconductor chips attached to a lead frame. This device is disclosed in Japanese Published Patent Application 26827/87. As shown in the drawing, a chase block 1 is equipped with a plurality of cavities (not shown) accommodating semiconductor devices (not shown) mounted on lead frames. This chase block 1 is of the same height as a chamber block (not shown) equipped with a well-known potting section (not shown) for injecting plastic as well as a runner section (not shown). The chamber block and chase block 1 are fastened to a retention board 2 by means of bolts. Heaters 3 for heating the chamber block (not shown) and chase block 1 and keeping them warm are inserted into retention board 2. Spacer blocks 4 supporting the retention board 2 on the base 7 are provided with guide grooves 4a for fixtures 8 for fixing the entire device mentioned above to a well-known press slide frame 9. A post 6 supports the retention board 2 on the base 7. Posts 5 on both sides of the post 6 also support the retention board 2. The post 6 is higher than the posts 5, which are higher than the spacer blocks 4. These differences in height are shown as $\delta_1$, $\delta_2$ in FIG. 2. In regard to the retention board 2 which serves as a continuous beam and the spacer blocks and the posts 5, 6 as fulcrums, the differences $\delta_1$, $\delta_2$ may be determined by calculating the height of the posts 5 and 6 from the reaction force and spring constant at each fulcrum (i.e. at the spacer blocks 4 and the posts 5, 6) under the press clamping force. The condition for this calculation is that the height of the spacer blocks 4 and the posts 5, 6 under the press clamping force be the same. The base 7, which supports retention board 2 through the spacer blocks 4 and posts 5, 6, contains an insulating plate 7a for preventing the heat of the heaters 3 from being transmitted to the press slide frame 9. The chase block 1, chamber block, retention board 2, spacer blocks 4, posts 5, 6 and base 7 form a lower die. An upper die 10 of the resin sealing device has substantially the same construction as the lower die described above. Reference numeral 11 denotes a press platen and 12 a parting surface of said chase block 1.

In a device thus constructed, the press clamping force during a resin sealing operation causes a uniform load to be applied to the parting surface 12. This load is received by the retention board 2, and is then distributed to the posts 5 and 6. The load thus distributed is then received by the base 7 and finally received by the press slide frame 9. Since the height of the posts 5 and 6 are so determined that the upper ends of the spacer blocks 4 and the posts 5, 6 are in one plane after the deflection caused by the press clamping force, the parting surface 12 of the chase block 1 can be, as shown in FIG. 3, kept planar. The posts 5, 6 and the spacer blocks 4 are formed beforehand with dimensions based on the calculation formula. Then, after assembling the device, the height of the posts 5, 6 and the spacer blocks 4 are adjusted by gauging while checking how the die faces meet each other. As stated above, the heaters 3 inserted into the retention board 2 heat the chase block 1 and keep it warm. Transmission and radiation of the heat generated in the process to the base 7 through the retention board 2, the posts 5, 6 and the spacer blocks 4 is prevented by the insulating plate 7a provided in the base 7. In other words, the insulating plate 7a prevents the heat transmission to the base 7 and thence to the press slide frame 9 that would otherwise take place through the posts 5, 6 and the spacer blocks 4 which are attached to both the retention board 2 and the base 7. The experimental temperature is 180° C. on the parting surface 12 and 120° C. on the surface of the base 7 on the side of the retention board 2. The temperature on the opposite surface of the base 7, on the other hand, is 50° C. because of the presence of the insulating plate 7a. In this way, the insulating plate 7a prevents the heat on the parting surface 12 from escaping.

As described above, conventional devices for resin sealing semiconductor devices absolutely need a heat insulating plate because the heat in the retention board 2 tends to be transmitted to the base through the posts 5, 6 and the spacer blocks 4. As a result, such conventional devices are rather expensive. Further, the uneven deformation of the insulating plate that occurs over time may give rise to a clearance between the parting surfaces of the two opposing chase blocks; consequently, lead frames become subject to the generation of resin burrs.

Moreover, the height of the posts and the spacer blocks must be adjusted by gauging while checking how the die parting surfaces meet each other during operation, resulting in a complicated assembly process.

SUMMARY OF THE INVENTION

In view of the foregoing, it is an object of this invention to provide a method of and a device for resin sealing semiconductor devices that prevents resin burr generation and provides an easy assembly process during manufacture of such devices.

The method of resin sealing semiconductor devices of this invention comprises the steps of:

placing semiconductor devices in cavities provided in a pair of chase blocks;

press clamping said pair of chase blocks by applying pressurizing forces to them through respective support members capable of elastic compressive deformation; and injecting plastic into said cavities under this pressurized condition such as to resin seal said semiconductor devices.

The device for resin sealing semiconductor devices of this invention comprises:

a pair of chase blocks equipped with cavities for holding semiconductor devices;

a press machine for pressing said pair of chase blocks against each other through a pair of press surfaces;

a plurality of support members for holding said chase blocks above said press surfaces of the press machine and for elastically deforming during the press operation of said press machine; and a plastic injection means for injecting plastic into the cavities of said chase blocks.

BRIEF DESCRIPTION OF THE DRAWINGS

FIGS. 6 to 8 illustrate modifications of the first embodiment;

FIG. 9 is a sectional view of a second embodiment of the invention;

DETAILED DESCRIPTION OF THE PREFERRED EMBODIMENTS

Figure 1:
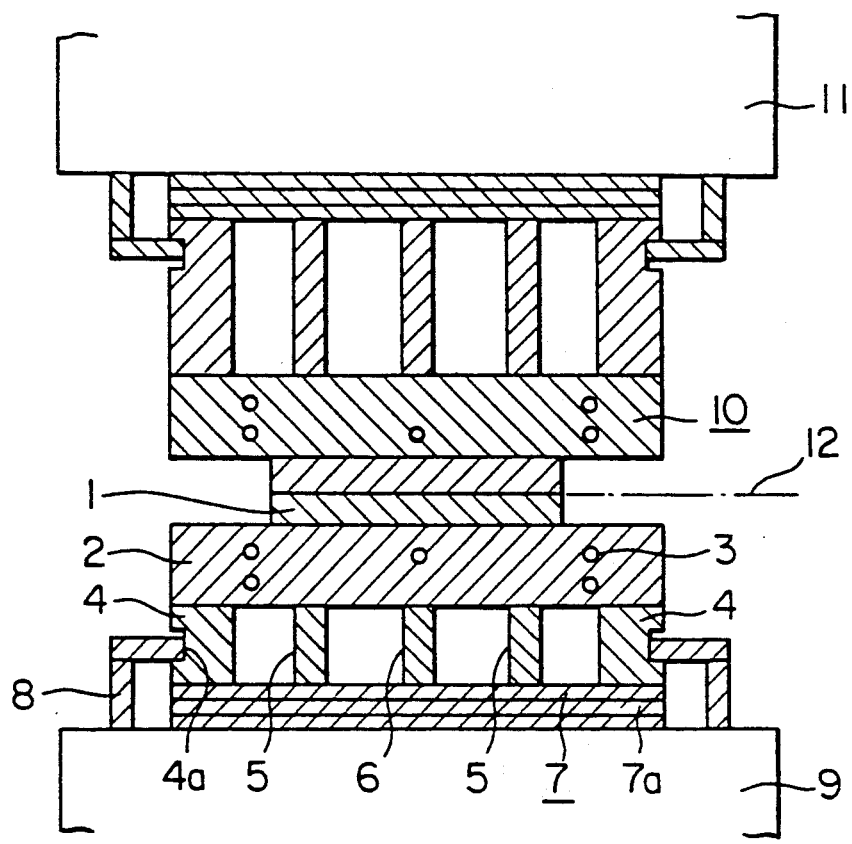
FIG. 1 is a sectional view of a conventional resin sealing device.
Figure 2:
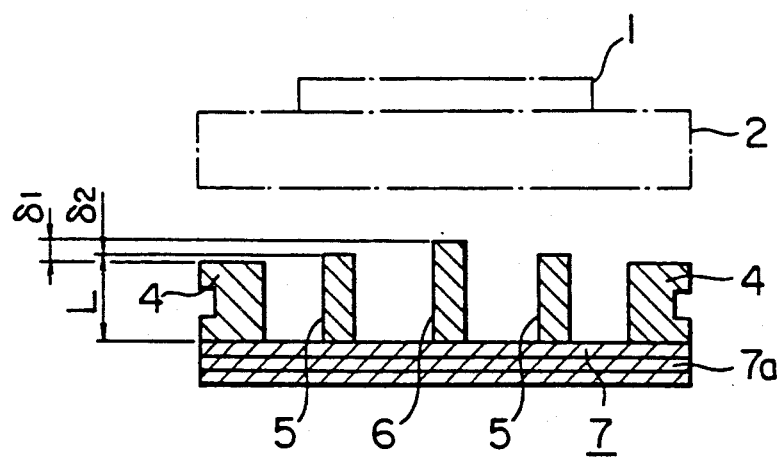
FIG. 2 is a partial section of the device of FIG. 1.
Figure 3:
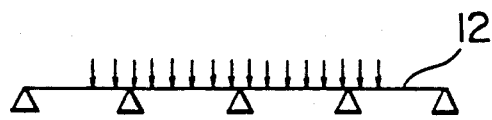
FIG. 3 shows a deflection curve during pressing in a conventional device.

A first embodiment of the invention will now be explained referring to FIGS. 4A to 4C. Illustrated in the drawings are chase blocks 20 each equipped with a runner 20a, a plurality of cavities 20b and gates 20c connecting the cavities 20b with the runner 20a; a chamber block 21 equipped with a pot 21a and runners 21b; guide pins 22 for effecting vertical alignment; an ejector mechanism 23 for discharging products after resin sealing; lead frames 24 with semiconductor chips bonded to them (shown in broken lines); first posts 25 arranged in the vicinity of the cavities 20b; and second posts 26 arranged under the chamber block 21. As shown in FIG. 4C, the first posts 25 are longer than the second posts 26 by a length B and longer than the spacer blocks 4 by a length A (A is greater than B). Further, the connection between the retention board 2 and the spacer blocks 4 is of a floating type, i.e., the retention board 2 is suspended with respect to the spacer blocks 4, raising of the retention board 2 being prevented by part (not shown) of the spacer blocks 4.

Figure 5:
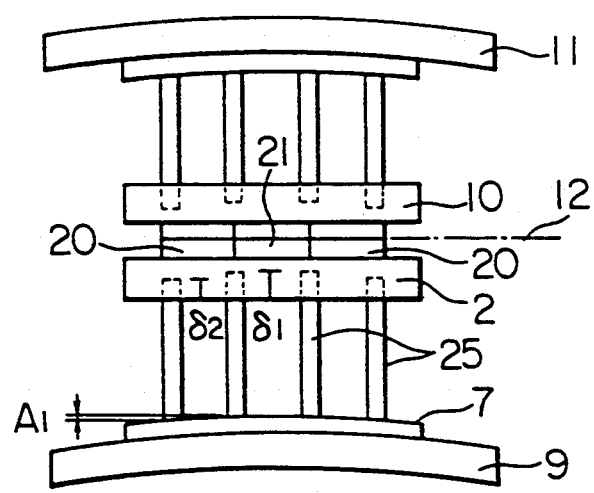
FIG. 5 is a side view illustrating deflection in the press section of the first embodiment.

As shown in FIG. 5, the first posts 25 undergo elastic compressive deformation by $\delta_1$ or $\delta_2$ under the press clamping forces applied to the retention board 2. The second posts 26 also undergo elastic compressive deformation by a predetermined amount under the pressure of a plunger (not shown) when it moves inside the pot 21a. Both the first and second posts 25 and 26 are so designed that they are higher than the spacer blocks 4 after the elastic compressive deformation. In other words, the spacer blocks 4 are always separated from the retention board 2 during both the pressing and the plastic injection procedure. Explanation of the other components will be omitted here since they are the same as those in conventional devices.

Figure 4A:
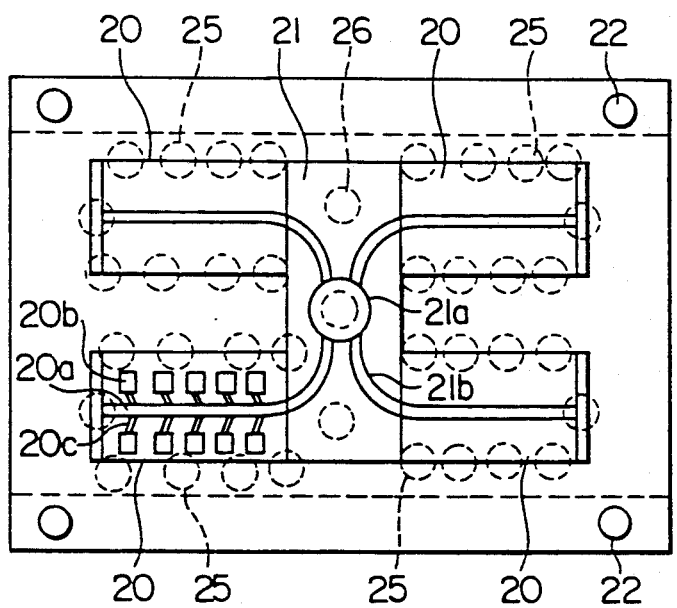
FIGS. 4A, 4B, and 4C are a plan view, a front view and a side view, respectively, of a first embodiment of the invention.
Figure 4C:
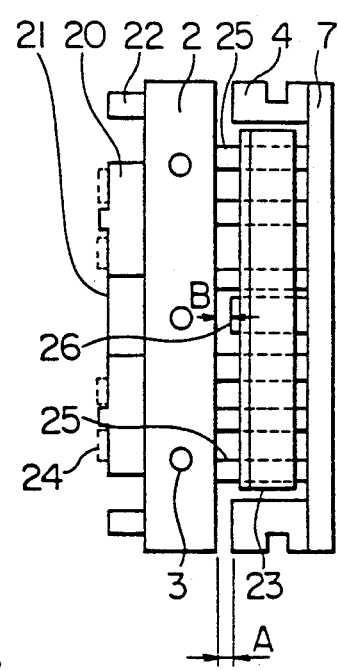
Figure 4B:
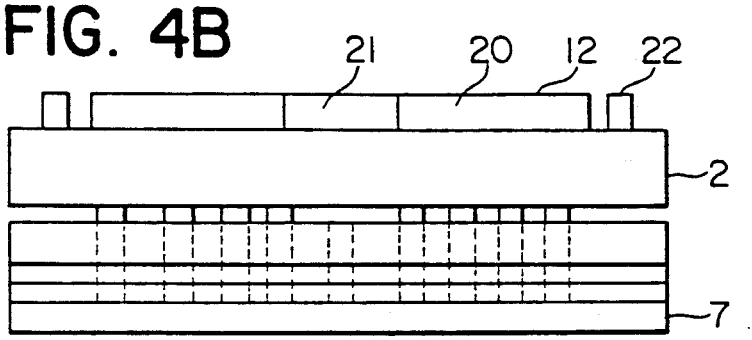

While FIGS. 4A to 4C only illustrate the lower die, the device also includes an upper die which has substantially the same construction as the lower die, the parting surfaces of both dies being opposed to each other.

The operation of the device will now be explained. First, the upper and lower dies are mounted on a press and closed. Then, the plastic in the pot 21a is pressed by the plunger (not shown). This plastic, which is initially in the pot 21a of the chamber block 21, flows through the runners 20a of the chase blocks 20 and enters the cavities 20b to resin seal semiconductor chips previously set therein. These semiconductor chips are set in the cavities 20b, bonded to the lead frames 24, and provided with gold wiring.

When pressurizing force is applied by means of a press, the first posts 25 which are arranged at equal intervals in the vicinity of the cavities 20b first receive the force and evenly pressurize the portions around the cavities 20b through the retention board 2. In this condition, the retention board 2 has undergone parallel displacement toward the base 7 by a distance corresponding to the amount of the compressive deformation. The parting surfaces 12 of the upper and lower dies are kept in an evenly pressurized condition. When, as in FIG. 5, the press section is bent by deformation, the compressive deformation amounts $\delta_1$, $\delta_2$ of the first posts 25 may be determined as several times the amount of deformation $A_1$ of the press member during pressing. Therefore, any deformation of the press member will be easily absorbed by the elastic compressive deformation of the plurality of posts 25, whereby a uniform pressurizing force can be applied to the parting surfaces 12. In other words, it is not necessary to check how the parting surfaces 12 of the dies meet each other before determining the height of the first posts 25, which simplifies the work of assembling the device. The distance B in regard to the second post 26 should be such that the chase blocks 20 are supported without being deformed by the plastic injection pressure, and the distance A should be such that the spacer blocks 4 do not come into contact with the retention board 2 even during pressing.

By supporting the retention board 2 in this way by means of the posts 25, 26 which are in contact with it over a small area only, a sufficient degree of thermal insulation can be attained. An experiment has shown that when the temperature of the parting surface 12 is 180° C., that of the base 7 is 60° C., a temperature that can in practice be ignored. In Table 1, the insulation obtained by the present invention is compared with that of a prior art device. This table shows that the upper surface of the base 7 can be reduced to 60° C. because of the posts 25, 26, whereas it is as high as 120° C. in the prior art. One may conclude from this that the posts 25, 26 provide a sufficient thermal insulating effect.

TABLE 1

| | Temperature | | |
|---|---|---|---|
| | Parting surface 12 | Upper section of base 7 | Lower section of base 7 (Lower section of insulating plate) |
| Prior art | 180° C. | 120° C. | 50° C. |
| This invention | 180° C. | 60° C. | — |

Figure 6:
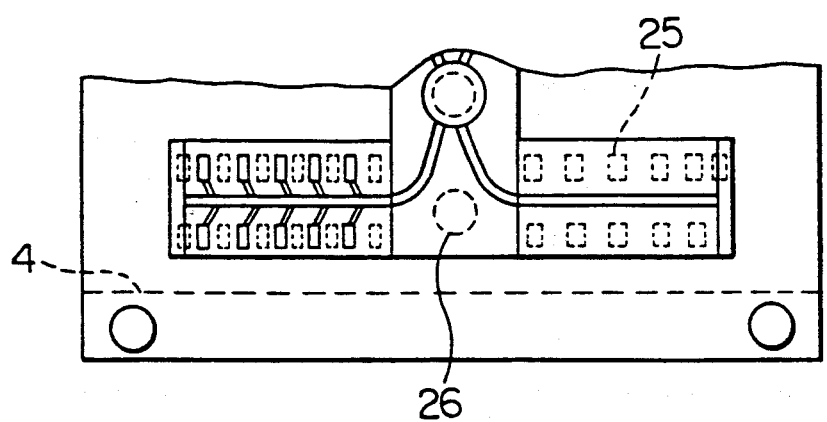

While the cross-section of the first post 25 is round in the first embodiment described above, a similar effect can be obtained by employing posts with a rectangular cross-section and arranging them suitably. This is shown in FIG. 6 as a second embodiment. Here, such rectangular posts, which are longer than the posts 26 and the spacer blocks 4, are arranged between the cavities 20b.

Further, while in the above embodiment the posts 25, 26 are arranged between the retention board 2 and the base 7, a similar effect can also be attained by arranging the posts between the blocks 20, 21 and the retention board 2 and directly pressurizing the blocks 20, 21 with those posts.

As will be appreciated from the above explanation of the first and second embodiments, the present invention provides sufficient thermal insulation between the retention board and the base, so that the expensive insulating plate can be dispensed over and generation with time of resin burrs on the lead frames can be avoided for a long period of time. Further, since the deformation during pressing is absorbed by the elastic compressive deformation of the posts, the height of the posts can be determined beforehand, without checking how the parting surfaces meet each other, so that the work of assembling the device can be simplified. In particular, by making the posts in the vicinity of the cavities higher than the others, reliable closing of the cavity section is assured by these posts, which enhances the effect of guarding against resin burr generation.

As shown in FIG. 7, a post 71 with a honeycomb construction can also be used. The entire post 71 may be formed from a stainless steel. This enhances the thermal resistance of the posts themselves, whereby the thermal transmission between the retention board 2 and the base 7 can be greatly restrained.

Further, a post 81 shown in FIG. 8 may also be used. This post 81 is composed of an axially elongated section 121A and flange sections 121b formed on both ends of the base section 121A for abutting against retention board 2 and base 7. The entire post 81 may be formed from a super strength steel. Here, the outer diameter of the base section 121A is smaller than that of the regular posts 5, 6 and the outer diameter of the flange sections 121B is larger than that of the regular posts 5, 6.

This configuration enhances the thermal resistance of the posts themselves, thereby greatly restraining the heat transmission between the retention board 2 and the base 7.

Furthermore, this modification shown in FIG. 8 makes it possible to keep the bearing stress on the flange sections 121B of the post 81 low and the stress on the base section 121A high, so that the elastic compressive deformation of the post can be augmented.

Figure 10:
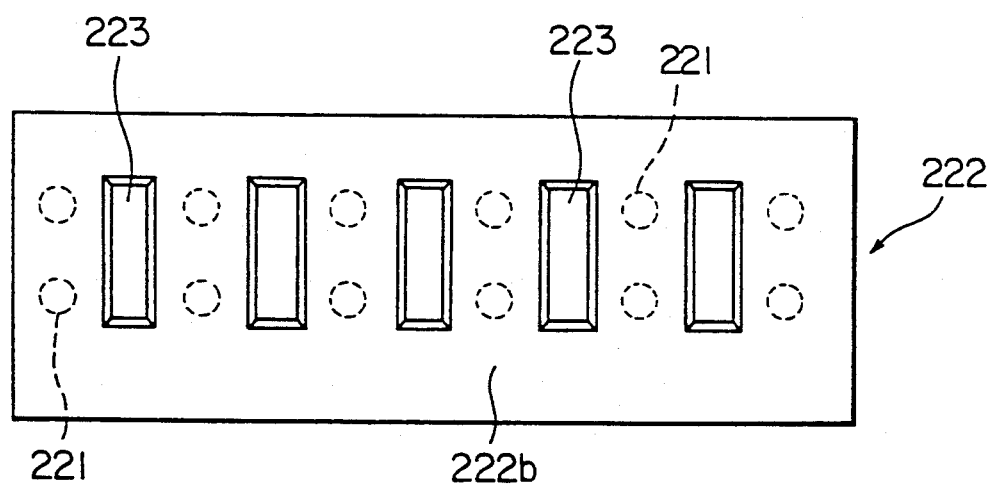
FIG. 10 is a plan view showing the chase block in the second embodiment.

FIG. 9 is a sectional view of the lower die in the second embodiment of the device for resin sealing semiconductor chips in accordance with the present invention, and FIG. 10 is a plan view of the chase block in the same embodiment. In this embodiment, a retention board 201 with built-in heaters (not shown) is fixed to a base 203 through spacer blocks 204. Cylindrical support pins 221, provided with high hardness by way of a heat treatment, are arranged below cavities (described later). These support pins 221 are all of the same height and capable of elastic axial deformation within a permissible range of 30 to 80 $\mu$m. Chase blocks 222 with a U-shaped cross section, supported by the support pins 221, are arranged on retention board 201 spaced apart from each other by a predetermined distance. The height of the side wall sections 222a of these chase blocks 222 is smaller than that of said support pins 221 by a distance H. The chase blocks 222 are provided with a plurality of cavities 223 which open into parting surfaces 222b. An ejector mechanism composed of ejector pins 224a and ejector plates 224b is provided inside each of the chase blocks 222. Further, the distance between the chase blocks 222 and the retention board 201 is maintained even when the support pins have undergone elastic compressive deformation. Another die (not shown) of the same construction is arranged above this one.

In the device for resin sealing semiconductor devices thus constructed, the chase blocks 222 are supported by a multitude of support pins 221 situated on the retention board 201 and below the cavities 223. Since the chase blocks 222 of the upper and lower dies (only the lower one is shown) are thus positioned apart from the retention board 201, their deformation during closing can be avoided by allowing only the support pins 221 to undergo elastic compressive deformation in the axial direction.

Accordingly, the parting surfaces 222b of the chase blocks 222 can be in close contact with each other during closing, whereby the pressurizing force is evenly applied to the parting surfaces 222b.

Figure 11:
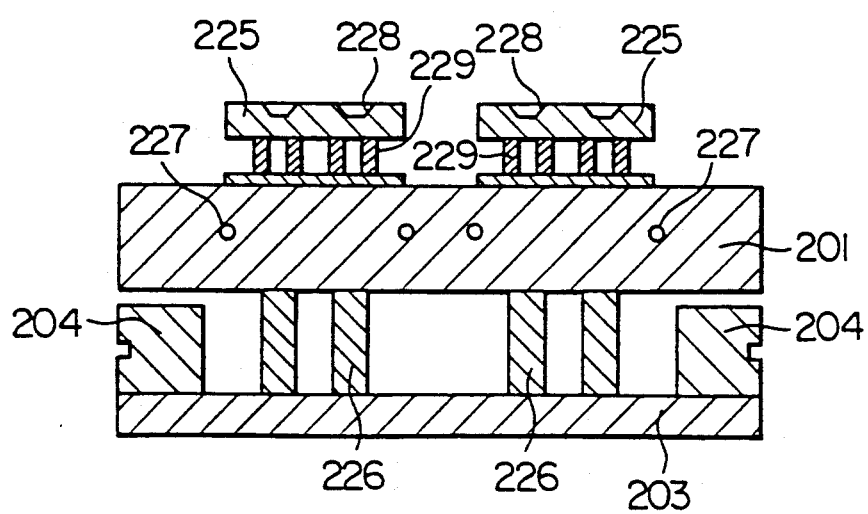
FIG. 11 is a sectional view showing a modification of the second embodiment.

While in the second embodiment the chase blocks 222 are separated from the retention board 201, it is also possible, as shown in FIG. 11, to position the spacer blocks 204 apart from the retention board 201. This arrangement makes it possible to prevent deformation not only of the chase blocks 225 but also of the retention block 201. In this embodiment shown in FIG. 11, support pins 226, capable of elastic compression during closing, support the retention board 201 above the base 203. This embodiment further includes heaters 227, cavities 228 and support pins 229 which are similar to the support pins 221 of the second embodiment.

While the support pins 221 in the second embodiment are cylindrical, pins of different configuration, for example prism-like pins, may also be employed.

The number of support pins 221 is not restricted to that adopted in the above embodiments.

As described above, the chase blocks in the embodiments shown in FIGS. 9 to 11 are equipped with cavities that open into the parting surfaces. These chase blocks are supported by a multitude of support pins and are arranged on the retention board spaced apart from each other by a predetermined distance. Since these support pins are situated below the cavities, deformation of the chase blocks during closing can be avoided and the parting surfaces can be brought into close contact with each other. Accordingly, pressurizing force during closing can be uniformly applied to the parting surfaces, whereby generation of resin burrs on the lead frames on the chase blocks can be positively prevented.

What is claimed is:

1. A method of resin sealing semiconductor devices comprising:
    placing semiconductor devices in cavities provided in a pair of chase blocks;
    clamping the pair of chase blocks together in a press having two opposed press surfaces, two bases, one of the bases being disposed on each of the press surfaces, two retention boards, each retention board supporting one of the chase blocks, spacer blocks disposed between the respective bases and retention boards, a plurality of support members disposed between and contacting the respective bases and retention boards for transmitting forces to the chase blocks from the press, the support members being longer between the respective bases and retention boards than the spacer blocks;
    actuating the press and thereby applying a compressive force to urge the chase blocks together, the compressive force being transmitted from the press to the chase blocks through the support members, elastically compressing the support members, while maintaining clearance between the respective retention boards and spacer blocks; and injection plastic into the cavities while clamping the pair of chase blocks together to resin seal said semiconductor devices.

2. A method of resin sealing semiconductor devices comprising:

placing semiconductor devices in cavities provided in a pair of chase blocks;

clamping the pair of chase blocks together in a press having two opposed press surfaces, two bases, one of the bases being disposed on each of the press surfaces, two retention boards, each retention board being fixedly mounted to one of the bases, spacer blocks disposed between the respective bases and retention boards for supporting the retention boards, a plurality of support pins disposed between and contacting the respective bases and retention boards and chase blocks for transmitting forces to the chase blocks from the press, the chase blocks having recesses facing the respective retention boards, the support pins being disposed within the recesses in the chase blocks and having lengths between the respective retention boards and chase blocks sufficient to maintain a separation between the respective retention boards and the chase blocks when the chase blocks are clamped together in the press;

actuating the press and thereby applying a compressive force to urge the chase blocks together, the compressive force being transmitted from the press to the chase blocks through the support pins, elastically compressing the support pins while maintaining clearance between the respective retention boards and chase blocks; and injecting plastic into the cavities while clamping the pair of chase blocks together to resin seal said semiconductor devices.

* * * * *